United States Patent
Ha (10) Patent No.: US 12,202,144 B2
(45) Date of Patent: Jan. 21, 2025

(54) METHOD, SYSTEM, AND NON-TRANSITORY COMPUTER-READABLE RECORDING MEDIUM FOR CONTROLLING A ROBOT TO LOAD AND UNLOAD A TARGET OBJECT

(71) Applicant: Bear Robotics, Inc., Redwood City, CA (US)

(72) Inventor: John Jungwoo Ha, Frisco, TX (US)

(73) Assignee: Bear Robotics, Inc., Redwood City, CA (US)

( * ) Notice: Subject to any disclaimer, the term of this patent is extended or adjusted under 35 U.S.C. 154(b) by 147 days.

(21) Appl. No.: 17/361,476

(22) Filed: Jun. 29, 2021

(65) Prior Publication Data

US 2022/0410392 A1    Dec. 29, 2022

(51) Int. Cl.
*B25J 9/16*    (2006.01)
*B25J 11/00*    (2006.01)

(52) U.S. Cl.
CPC ............. *B25J 9/1664* (2013.01); *B25J 9/162* (2013.01); *B25J 9/1661* (2013.01); *B25J 9/1682* (2013.01); *B25J 11/008* (2013.01)

(58) Field of Classification Search
CPC ........ B25J 9/1664; B25J 9/162; B25J 9/1661; B25J 9/1682; B25J 11/008; B25J 9/1679; B25J 5/007; G05D 1/0297; G05D 2201/0211; G05D 1/0212; G05D 1/0287; Y02P 90/02
See application file for complete search history.

(56) References Cited

U.S. PATENT DOCUMENTS

| | | | |
|---|---|---|---|
| 9,592,609 B2 * | 3/2017 | LaFary | G05B 19/4061 |
| 11,199,853 B1 * | 12/2021 | Afrouzi | B25J 13/006 |
| 2020/0249660 A1 * | 8/2020 | Rao | G05B 13/0265 |
| 2022/0351104 A1 * | 11/2022 | Lodhia | G06Q 10/0631 |
| 2023/0062304 A1 * | 3/2023 | Bidram | B25J 18/04 |
| 2024/0043207 A1 * | 2/2024 | Cheng | B25J 9/0009 |
| 2024/0198389 A1 * | 6/2024 | Liu | B25J 11/008 |

FOREIGN PATENT DOCUMENTS

| | | |
|---|---|---|
| JP | 2010055183 A | 3/2010 |
| JP | 2011245577 A | 12/2011 |
| JP | 2018106277 A | 7/2018 |
| JP | 2019153070 A | 9/2019 |
| JP | 2021009511 A | 1/2021 |
| KR | 101083700 B1 | 11/2011 |

\* cited by examiner

*Primary Examiner* — Adam R Mott
*Assistant Examiner* — Matthew C Gammon
(74) *Attorney, Agent, or Firm* — Dinsmore & Shohl LLP; Yongsok Choi, Esq.

(57) ABSTRACT

A method for controlling a robot is provided. The method includes the steps of: determining a target robot to travel to a first loading station among a plurality of robots, on the basis of information on a location of the first loading station and a task situation of each of the plurality of robots, when a first transport target object is placed at the first loading station; and determining a travel route of the target robot with reference to information on the location of the first loading station and a location of a first unloading station associated with the first transport target object.

9 Claims, 6 Drawing Sheets

METHOD, SYSTEM, AND NON-TRANSITORY COMPUTER-READABLE RECORDING MEDIUM FOR CONTROLLING A ROBOT TO LOAD AND UNLOAD A TARGET OBJECT

FIELD OF THE INVENTION

The present invention relates to a method, system, and non-transitory computer-readable recording medium for controlling a robot.

BACKGROUND

Serving means providing objects including drinks or food to customers in a place such as a restaurant. In recent years, robots and the like have been developed and used for serving in place of, or rendering assistance to, waiters or waitresses. Such a robot usually functions to take food orders or carry out serving according to the orders, and may perform autonomous navigation using table position information or the like. The robot may comprise a transport means (including sensors for avoiding obstacles), a display means for menu output or order input, and the like. Further, the robot may include a means for placing or carrying food or food containers.

As an example of related conventional techniques, Korean Registered Patent Publication No. 10-1083700 discloses a restaurant serving robot system for taking orders in a restaurant and transporting a tray where ordered food is placed, the system comprising: an upper part including a pair of articulated robot arms which are synchronously driven, and a tray holding part rotatably coupled to a lower end of the articulated robot arms and configured to fix the tray; a lower part at a bottom part of which a robot moving part including a main wheel and one or more auxiliary wheels is provided; a middle part fixed to the lower part and rotatably connected to the upper part; and a control part configured to control the operations of the pair of articulated robot arms, the tray holding part, and the robot moving part, wherein the tray holding part comprises: a hand rotatably coupled to an end of the articulated robot arms; a fixing part provided at the hand to move upward and downward; a gripper positioned at a bottom part of the tray and coupled to the fixing part; a stopper positioned at a top part of the tray and coupled to the fixing part to face the gripper; a switch pressed by the fixing part which moves upward when the stopper is pressed by the tray at the same time the end of the articulated robot arms is driven downward; a spring contracted when the fixing part moves upward; and a gripper angle detection unit configured to detect an angle of the gripper.

Meanwhile, as the market of delivery services for food and the like has grown significantly in recent years, new types of restaurants are emerging in large numbers, such as a restaurant using a kitchen shared by multiple businesses (i.e., a shared kitchen) rather than a traditional restaurant. In such a shared kitchen, it is necessary to transport food or the like prepared by each of the businesses to a specific location (e.g., a front desk or a food pickup station for delivery drivers). However, the techniques introduced so far as well as the above-described conventional technique have been focused on operation in a traditional restaurant, and thus are not suitable for automating transport processes in the shared kitchen.

In this connection, the inventor(s) present a technique for controlling a robot so that transport processes in a shared kitchen may be automated.

SUMMARY OF THE INVENTION

One object of the present invention is to solve all the above-described problems in the prior art.

Another object of the invention is to determine a target robot to travel to a first loading station among a plurality of robots, on the basis of information on a location of the first loading station and a task situation of each of the plurality of robots, when a first transport target object is placed at the first loading station, and to determine a travel route of the target robot with reference to information on the location of the first loading station and a location of a first unloading station associated with the first transport target object.

Yet another object of the invention is to automate transport processes in a shared kitchen.

The representative configurations of the invention to achieve the above objects are described below.

According to one aspect of the invention, there is provided a method for controlling a robot, the method comprising the steps of: determining a target robot to travel to a first loading station among a plurality of robots, on the basis of information on a location of the first loading station and a task situation of each of the plurality of robots, when a first transport target object is placed at the first loading station; and determining a travel route of the target robot with reference to information on the location of the first loading station and a location of a first unloading station associated with the first transport target object.

According to another aspect of the invention, there is provided a system for controlling a robot, the system comprising: a target robot determination unit configured to determine a target robot to travel to a first loading station among a plurality of robots, on the basis of information on a location of the first loading station and a task situation of each of the plurality of robots, when a first transport target object is placed at the first loading station; and a travel route determination unit configured to determine a travel route of the target robot with reference to information on the location of the first loading station and a location of a first unloading station associated with the first transport target object.

In addition, there are further provided other methods and systems to implement the invention, as well as non-transitory computer-readable recording media having stored thereon computer programs for executing the methods.

According to the invention, it is possible to determine a target robot to travel to a first loading station among a plurality of robots, on the basis of information on a location of the first loading station and a task situation of each of the plurality of robots, when a first transport target object is placed at the first loading station, and to determine a travel route of the target robot with reference to information on the location of the first loading station and a location of a first unloading station associated with the first transport target object.

According to the invention, it is possible to automate transport processes in a shared kitchen.

DETAILED DESCRIPTION OF THE INVENTION

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Meanwhile, although the cases in which the place where a robot is used is a shared kitchen are mainly described herein, it should be understood that the present invention is not necessarily applicable only to the robot used in the shared kitchen, and may also be applied to a robot used in a place such as a smart factory or a smart distribution center when transport processes similar to those of the shared kitchen are required.

Configuration of the Entire System

Figure 1:
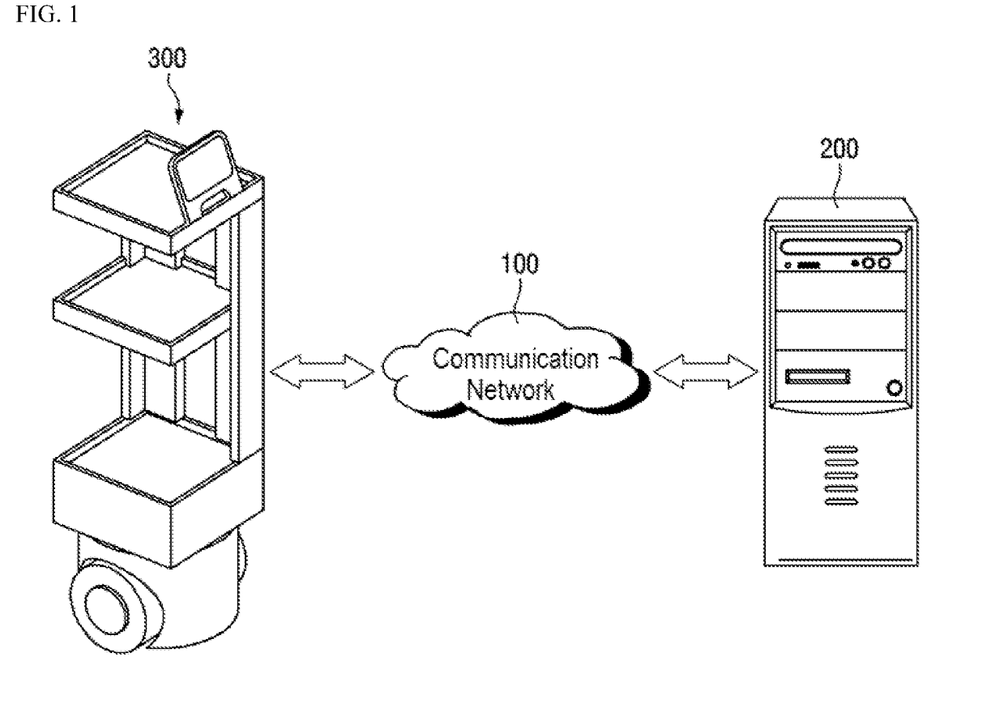
FIG. 1 schematically shows the configuration of an entire system for controlling a robot according to one embodiment of the invention.

FIG. 1 schematically shows the configuration of the entire system for controlling a robot according to one embodiment of the invention.

As shown in FIG. 1, the entire system according to one embodiment of the invention may comprise a communication network 100, a robot control system 200, and a robot 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution (LTE) communication, 5G communication, Bluetooth communication (including Bluetooth Low Energy (BLE) communication), infrared communication, and ultrasonic communication. As another example, the communication network 100 may be an optical communication network, at least a part of which may be implemented with a conventional communication scheme such as LiFi (Light Fidelity).

Next, the robot control system 200 according to one embodiment of the invention may communicate with the robot(s) 300 to be described below via the communication network 100, and may function to determine a target robot 300 to travel to a first loading station among a plurality of robots 300, on the basis of information on a location of the first loading station and a task situation of each of the plurality of robots 300, when a first transport target object is placed at the first loading station, and to determine a travel route of the target robot 300 with reference to information on the location of the first loading station and a location of a first unloading station associated with the first transport target object.

The configuration and functions of the robot control system 200 according to the invention will be discussed in more detail below.

Next, the robot 300 according to one embodiment of the invention is a device capable of communicating with the robot control system 200 via the communication network 100 and performing predetermined functions or assigned tasks (e.g., transporting objects) autonomously without any operation of a user (e.g., an employee or a customer). The robot 300 according to one embodiment of the invention may include at least one of a module (e.g., a grab or a robotic arm module) for loading and unloading a transport target object (e.g., takeout food), an image acquisition module (e.g., a visible light camera or an infrared camera) for acquiring images of surroundings, a sound acquisition module (e.g., a microphone) for acquiring sounds of surroundings, a display and speaker module for providing images and sounds, and a drive module (e.g., a motor) for moving the robot 300.

Meanwhile, according to one embodiment of the invention, the robot 300 may include an application (not shown) for controlling the robot 300 according to the invention. The application may be downloaded from the robot control system 200 or an external application distribution server (not shown). Meanwhile, the characteristics of the application may be generally similar to those of a target robot determination unit 210, a travel route determination unit 220, a transfer module control unit 230, a communication unit 240, and a control unit 250 of the robot control system 200 to be described below. Here, at least a part of the application may be replaced with a hardware device or a firmware device that may perform a substantially equal or equivalent function, as necessary.

Configuration of the Robot

For example, the robot 300 according to one embodiment of the invention may perform tasks similar to those performed by at least one of a guide robot, a serving robot, a transport robot, a cleaning robot, a medical robot, an entertainment robot, a pet robot, and an unmanned flying robot, and may be implemented in various forms corresponding to the respective tasks.

Figure 3:
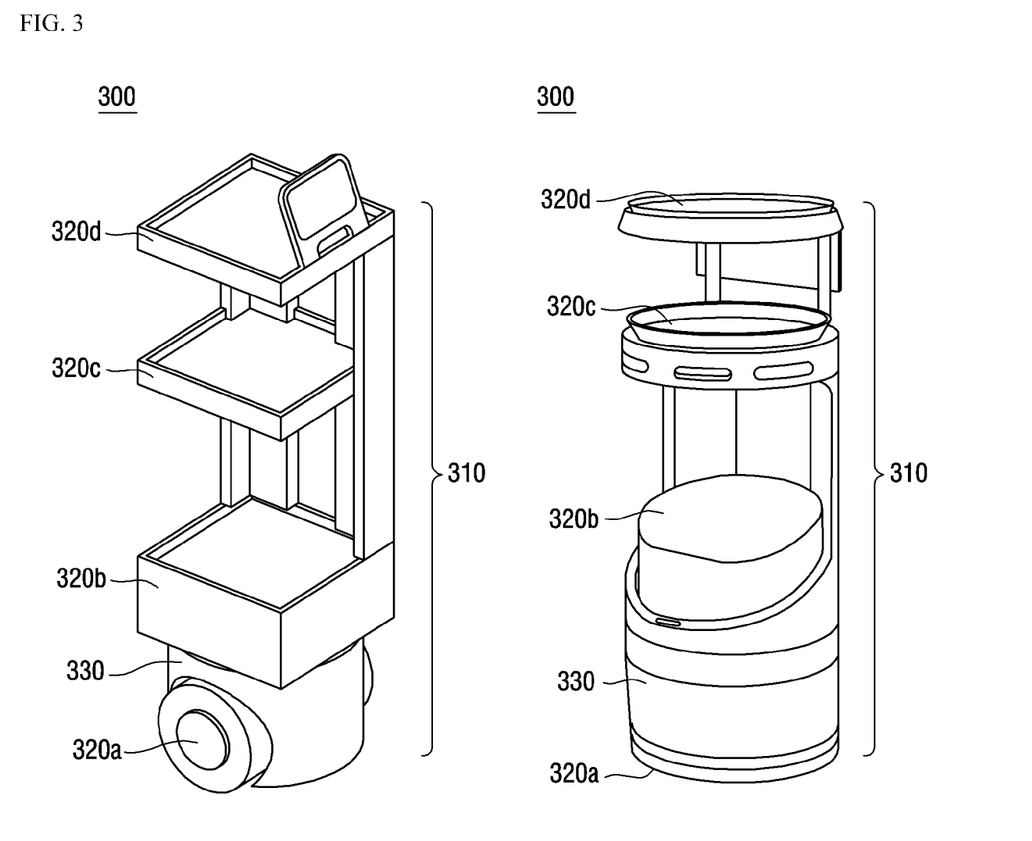
FIG. 3 illustratively shows the structure of a robot according to one embodiment of the invention.
Figure 4:
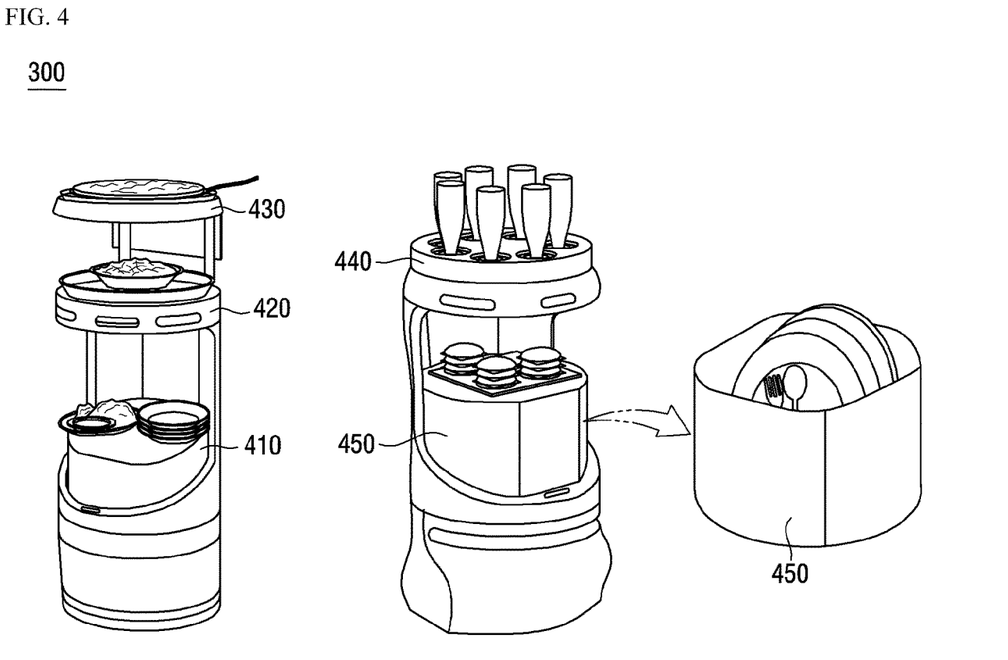
FIG. 4 illustratively shows the structure of a robot according to one embodiment of the invention.

FIGS. 3 and 4 illustratively show the structure of a robot according to one embodiment of the invention.

Referring to FIG. 3, the robot 300 may comprise a main body 310, a drive unit 320a, 320b, 320c, 320d, and a processor 330.

For example, the main body 310 according to one embodiment of the invention may include at least one loading space for loading an object to be transported and/or an object to be retrieved. The transported object and the retrieved object according to one embodiment of the invention may refer to all material objects that can be moved, and may encompass things, animals, and people, for example. For example, the transported object may be food (or takeout food) and the retrieved object may be a container containing the food.

Referring to FIG. 4, when the robot 300 is a serving robot, it may include a first space 410 and a second space 420 for providing the transported object and/or collecting the retrieved object. Further, the robot 300 may further include a third space 430 that is an expansion space provided via a removable pillar, and more loading spaces may be provided by adding more expansion spaces as needed. Further, the robot 300 may further include a tray 440 dedicated for the transported object and/or the retrieved object. For example, the tray 440 may be configured such that a plurality of circular grooves are formed on its top side as seen from the top. Each of the circular grooves may be formed such that the lower part of a cup containing a drink is seated and easily fixed to some extent. The sizes of the circular grooves may be diverse. Further, the lower part of the first space 410 of the robot 300 may include a fourth space 450 that may be taken out through a lateral side of the robot 300. The fourth space 450 according to one embodiment of the invention may have a shape similar to a basket, such that an empty space is formed therein; a lateral side thereof is closed; a top side thereof is open; and a bottom side thereof is closed. However, the loading spaces of the robot 300 according to the invention are not necessarily limited to the above description, and may be diversely implemented as other types of loading spaces as long as the objects of the invention may be achieved.

Meanwhile, referring back to FIG. 3, the main body 310 may further include an image acquisition module (e.g., a visible light camera or an infrared camera) (not shown) and a scanner module (e.g., a LIDAR sensor) for acquiring images of surroundings (e.g., customers, tables, employees, other robots 300, etc.) and information on obstacles.

Next, the drive unit 320a, 320b, 320c, 320d according to one embodiment of the invention may comprise a module for moving the main body 310 to other locations or a module for loading and unloading the transported object and/or the retrieved object.

For example, the drive unit 320a, 320b, 320c, 320d may include a module related to electrically, mechanically, or hydraulically driven wheels, propellers, or the like as the module for moving the main body 310 to other locations, and may include a robotic arm module for mounting and conveying the transported object and/or the retrieved object as the module for loading and unloading the transported object and/or the retrieved object.

Next, the processor 330 according to one embodiment of the invention may be electrically connected to the drive unit 320a, 320b, 320c, 320d to perform a function of controlling the drive unit 320a, 320b, 320c, 320d (and may include a communication module for communicating with an external system). For example, the processor 330 may refer to a data processing device that are embedded in hardware and have circuits physically structured to perform codes included in a program or functions represented by instructions. For example, such a data processing device embedded in hardware may include a processing device such as a microprocessor, a central processing unit, a processor core, a multi-processor, an application-specific integrated circuit (ASIC), and a field programmable gate array (FPGA).

Further, the processor 330 may perform the functions of at least one of the target robot determination unit 210, the travel route determination unit 220, and the transfer module control unit 230 of the robot control system 200 according to the invention (e.g., the corresponding functions may be modularized and included in the processor 330), and may function to control the drive unit 320a, 320b, 320c, 320d through communication with an external system (not shown) that performs the functions of at least one of the target robot determination unit 210, the travel route determination unit 220, and the transfer module control unit 230.

Specifically, the processor 330 may function to determine a target robot to travel to a first loading station among a plurality of robots, on the basis of information on a location of the first loading station and a task situation of each of the plurality of robots, when a first transport target object is placed at the first loading station, and to determine a travel route of the target robot with reference to information on the location of the first loading station and a location of a first unloading station associated with the first transport target object.

Configuration of the Robot Control System

Hereinafter, the internal configuration of the robot control system 200 crucial for implementing the invention and the functions of the respective components thereof will be discussed.

Figure 2:
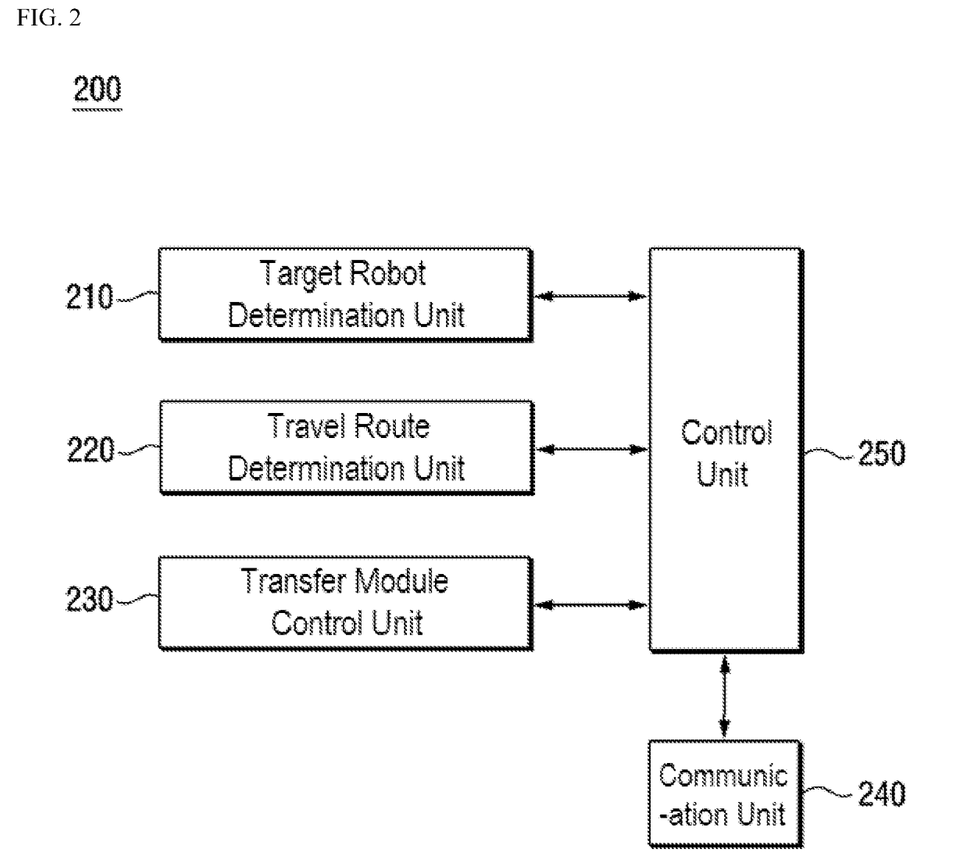
FIG. 2 specifically shows the internal configuration of a robot control system according to one embodiment of the invention.

FIG. 2 specifically shows the internal configuration of the robot control system 200 according to one embodiment of the invention.

As shown in FIG. 2, the robot control system 200 according to one embodiment of the invention may comprise a target robot determination unit 210, a travel route determination unit 220, a transfer module control unit 230, a communication unit 240, and a control unit 250. According to one embodiment of the invention, at least some of the target robot determination unit 210, the travel route determination unit 220, the transfer module control unit 230, the communication unit 240, and the control unit 250 may be program modules that communicate with an external system. The program modules may be included in the robot control system 200 in the form of operating systems, application program modules, and other program modules, while they may be physically stored in a variety of commonly known storage devices. Further, the program modules may also be stored in a remote storage device that may communicate with the robot control system 200. Meanwhile, such program modules may include, but are not limited to, routines, subroutines, programs, objects, components, and data structures for performing specific tasks or executing specific abstract data types according to the invention as will be described below.

Meanwhile, the above description is illustrative although the robot control system 200 has been described as above, and it will be apparent to those skilled in the art that at least a part of the components or functions of the robot control system 200 may be implemented or included in the robot 300 or an external system (not shown), as necessary. Further, in some cases, all of the functions and components of the robot control system 200 may be implemented or included in the robot 300.

First, the target robot determination unit 210 according to one embodiment of the invention may function to decide whether a first transport target object is placed at a first loading station.

Specifically, the target robot determination unit 210 according to one embodiment of the invention may acquire, from a weight sensor included in the first loading station, information on a weight sensed by the weight sensor or a change in the weight as weight information on the first loading station. According to one embodiment of the invention, the weight information may be acquired for each of at least one support included in the first loading station.

Further, the target robot determination unit 210 according to one embodiment of the invention may acquire, from a photographing module configured to face a spatial region above the at least one support included in the first loading station, information on an image photographed by the photographing module or a change in the image as image information on the first loading station. According to one embodiment of the invention, the image information may be acquired for each of the at least one support included in the first loading station.

In addition, the target robot determination unit 210 according to one embodiment of the invention may specify a loading station where the first transport target object is placed (i.e., the first loading station), among a plurality of loading stations in a serving place (e.g., a shared kitchen), on the basis of at least one of the weight information on the first loading station and the image information on the first loading station acquired as above. Further, when a plurality of supports are included in the first loading station, the target robot determination unit 210 according to one embodiment of the invention may specify a support where the first transport target object is placed among the plurality of supports.

Figure 5:
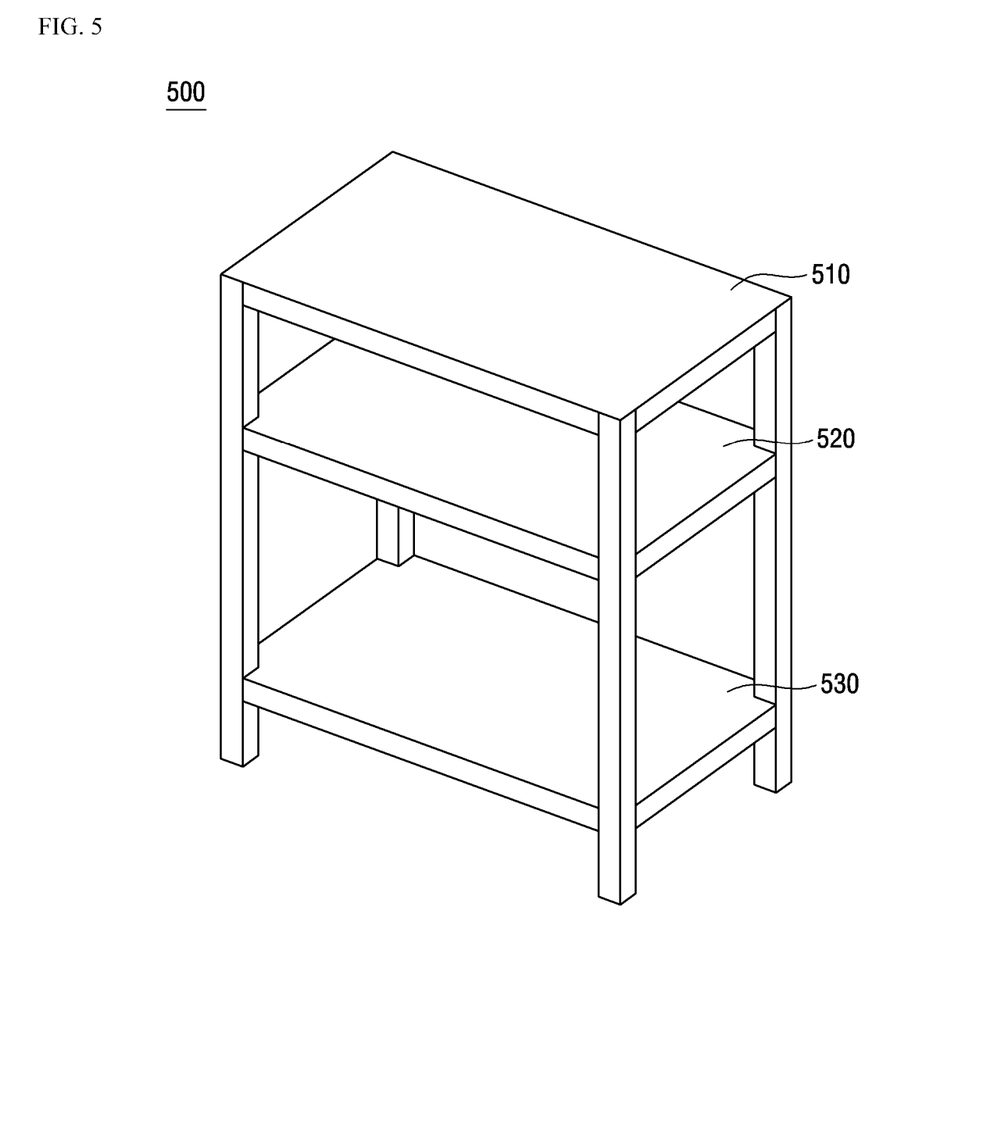
FIG. 5 illustratively shows the structure of a loading station according to one embodiment of the invention.

FIG. 5 illustratively shows the structure of a loading station according to one embodiment of the invention.

More specifically, referring to FIG. 5, a loading station 500 according to one embodiment of the invention may refer to a structure where at least one transport target object (e.g., takeout food) may be placed, and may be in the form of a rack including at least one support 510, 520, and 530. According to one embodiment of the invention, at least one loading station 500 may be installed for each business belonging to a serving place (e.g., a shared kitchen).

Meanwhile, according to one embodiment of the invention, each of the supports 510, 520, and 530 may include a weight sensor (not shown) configured to sense a weight supported by each of the supports 510, 520, and 530, and the weight sensor may be implemented using one or more strain gauges (e.g., three strain gauges, four strain gauges, or the like).

Further, according to one embodiment of the invention, the loading station 500 may include a photographing module (not shown) configured to face a spatial region above each of the supports 510, 520, and 530, in place of or in addition to the weight sensor. Here, the photographing modules configured to face the spatial regions above the respective supports 510, 520, and 520 are not necessarily included in the loading station 500, but at least some of the photographing modules may be installed on a structure in the serving place (e.g., shared kitchen).

Meanwhile, when the first transport target object is placed at the first loading station 500 as above, the target robot determination unit 210 according to one embodiment of the invention may function to determine a target robot 300 to travel to the first loading station 500 among a plurality of robots 300, on the basis of information on a location of the first loading station 500 and a task situation of each of the plurality of robots 300.

Specifically, according to one embodiment of the invention, the information on the location of the first loading station 500 may refer to coordinate information on a location of the first loading station 500 in the serving place. Further, when the first loading station 500 includes a plurality of supports 510, 520, and 530, the location of the first loading station 500 may refer to a location of a support where the first transport target object is placed among the plurality of supports 510, 520, and 530. In addition, according to one embodiment of the invention, the information on the task situation of the robot 300 may include information on at least one of a location of the robot 300, a travel route of the robot 300, and a transport situation of the robot 300.

More specifically, according to one embodiment of the invention, the information on the location of the robot 300 may refer to coordinate information on a current location of the robot 300 in the serving place. Further, the information on the travel route of the robot 300 may refer to information on a destination, a waypoint, and the like of the robot 300 and a route for reaching the destination, the waypoint, and the like. Of course, when the robot 300 traverses the serving place along a predetermined route without a specific destination or waypoint, the travel route of the robot 300 may refer to the predetermined route.

For example, the target robot determination unit 210 according to one embodiment of the invention may determine a robot 300 closest to the first loading station 500 or a robot 300 expected to have the shortest time required to reach the first loading station 500, among the plurality of robots 300, as the target robot 300.

Further, the target robot determination unit 210 according to one embodiment of the invention may determine the information on the transport situation of the robot 300 on the basis of information on a second transport target object (e.g., takeout food) associated with the robot 300. Referring to FIG. 4, according to one embodiment of the invention, the second transport target object associated with the robot 300 may refer to a transport target object loaded in the loading spaces 410, 420, and 430 of the robot 300. According to one embodiment of the invention, the information on the second transport target object may include information on a loading space where the object is located among the plurality of loading spaces 410, 420, and 430, whether the object is loaded in the robot 300 when the robot 300 arrives at the first loading station 500, and the like. To this end, each of the loading spaces 410, 420, and 430 of the robot 300 may include a weight sensor (not shown) configured to sense a weight supported by each of the loading spaces 410, 420, and 430 and/or a photographing module (not shown) configured to face a spatial region above each of the loading spaces 410, 420, and 430. According to one embodiment of the invention, the weight sensor and the photographing module may be similar to the weight sensor and the photographing module described above in connection with the loading station 500.

Next, the target robot determination unit 210 according to one embodiment of the invention may determine whether the robot 300 is capable of loading the first transport target object, as the information on the transport situation of the robot 300, on the basis of the information on the second transport target object associated with the robot 300.

For example, the target robot determination unit 210 according to one embodiment of the invention may determine a robot 300 capable of loading the first transport target object (e.g., a robot 300 in which at least one loading space 410, 420, and 430 is empty), among the plurality of robots 300, as the target robot 300. Further, the target robot determination unit 210 according to one embodiment of the invention may determine a robot 300 closest to the first loading station 500 or a robot 300 expected to have the shortest time required to reach the first loading station 500, among the robots 300 capable of loading the first transport target object, as the target robot 300.

Furthermore, referring to FIG. 5, the target robot determination unit 210 according to one embodiment of the invention may determine whether the robot 300 is capable of loading the first transport target object, in consideration of a support where the first transport target object is placed among the plurality of supports 510, 520, and 530 included in the first loading station 500, and a loading space where the second transport target object is loaded among the loading spaces 410, 420, and 430 of the robot 300.

For example, when the first transport target object is placed on the support 520 of the second tier among the supports 510, 520, and 530 corresponding to the first to third tiers of the first loading station 500, the target robot determination unit 210 according to one embodiment of the invention may determine a robot 300 closest to the first loading station 500 or a robot 300 expected to have the shortest time required to reach the first loading station 500, among the robots 300 in which the loading space 420 corresponding to the second tier among the loading spaces 410, 420, and 430 is empty, as the target robot 300.

Meanwhile, according to one embodiment of the invention, the second transport target object associated with the robot 300 may include a transport target object placed at a second loading station 500. Here, according to one embodiment of the invention, the transport target object placed at the second loading station 500 may refer to a transport target object that is not currently loaded in the robot 300 but is to be loaded in the robot 300 before or after arrival at the first loading station 500. The target robot determination unit 210 according to one embodiment of the invention may determine the target robot 300 on the basis of information on the transport target object to be loaded in the robot 300 as above, thereby preventing a situation in which the target robot 300 cannot load the first transport target object when arriving at the first loading station 500, or a situation in which the target robot 300 cannot load the second transport target object when arriving at the second loading station 500 (i.e., a situation in which loading of the first transport target object precludes loading of the second transport target object).

Meanwhile, the information on the task situation of the robot 300 according to one embodiment of the invention is not limited to the foregoing and may be diversely changed as long as the objects of the invention may be achieved.

Next, the travel route determination unit 220 according to one embodiment of the invention may function to determine a travel route of the target robot 300 with reference to information on the location of the first loading station 500 and a location of a first unloading station associated with the first transport target object.

Specifically, according to one embodiment of the invention, the first unloading station may refer to a destination (e.g., a front desk or a food pickup station for delivery drivers) to which the first transport target object placed at the first loading station 500 is to be transported by the target robot 300. According to one embodiment of the invention, the unloading station may be determined according to businesses belonging to the serving place or according to the loading stations 500 installed in the serving place, and may have a structure and function similar to those of the loading station 500 according to one embodiment of the invention.

Further, the travel route determination unit 220 according to one embodiment of the invention may determine the travel route of the target robot 300 such that the travel route of the target robot 300 includes the first loading station 500 and the first unloading station. Furthermore, when the travel route of the target robot 300 includes the second loading station 500 and a second unloading station associated with the second loading station 500 (i.e., a destination to which the second transport target object placed at the second loading station 500 is to be transported), the travel route determination unit 220 according to one embodiment of the invention may determine the travel route of the target robot 300 such that the target robot 300 may visit the first loading station 500, the first unloading station, the second loading station 500, and the second unloading station in an appropriate order. For example, the travel route determination unit 220 according to one embodiment of the invention may determine the travel route of the target robot 300 such that the target robot 300 may visit all of the above stations in the shortest time.

Next, the transfer module control unit 230 according to one embodiment of the invention may function to control a first transfer module such that the first transport target object is transferred from the first loading station 500 to the target robot 300 when the target robot 300 arrives at the first loading station 500.

Specifically, the first transfer module (not shown) according to one embodiment of the invention is a device for transferring a transport target object from a loading station 500 to the robot 300, and may have a means capable of performing a transfer function of a conveyor, a robotic arm, or the like. At least a part of the first transfer module may be included in or coupled to the loading station 500 and/or the robot 300. Further, the first transfer module according to one embodiment of the invention may include a means such as a sensor capable of recognizing the arrival of the robot 300, and a means for communicating with at least one of the robot 300, the loading station 500, and the robot control system 200. The transfer module control unit 230 according to one embodiment of the invention may cause the transport target object to be loaded into the robot 300 by operating the first transfer module when the robot 300 arrives at the loading station 500.

Further, the transfer module control unit 230 according to one embodiment of the invention may function to control a second transfer module such that the first transport target object is transferred from the target robot 300 to the first unloading station when the target robot 300 arrives at the first unloading station.

Specifically, the second transfer module (not shown) according to one embodiment of the invention is a device for transferring a transport target object from the robot 300 to an unloading station, and may have a means capable of performing a transfer function of a conveyor, a robotic arm, or the like. At least a part of the second transfer module may be included in or coupled to the unloading station and/or the robot 300. Further, the second transfer module according to one embodiment of the invention may include a means such as a sensor capable of recognizing the arrival of the robot 300, and a means for communicating with at least one of the robot 300, the unloading station, and the robot control system 200. The transfer module control unit 230 according to one embodiment of the invention may cause the transport target object to be unloaded from the robot 300 by operating the second transfer module when the robot 300 arrives at the unloading station.

Next, the communication unit 240 according to one embodiment of the invention may function to enable data transmission/reception from/to the target robot determination unit 210, the travel route determination unit 220, and the transfer module control unit 230.

Lastly, the control unit 250 according to one embodiment of the invention may function to control data flow among the target robot determination unit 210, the travel route determination unit 220, the transfer module control unit 230, and the communication unit 240. That is, the control unit 250 according to one embodiment of the invention may control data flow into/out of the robot control system 200 or data flow among the respective components of the robot control system 200, such that the target robot determination unit 210, the travel route determination unit 220, the transfer module control unit 230, and the communication unit 240 may carry out their particular functions, respectively.

Figure 6:
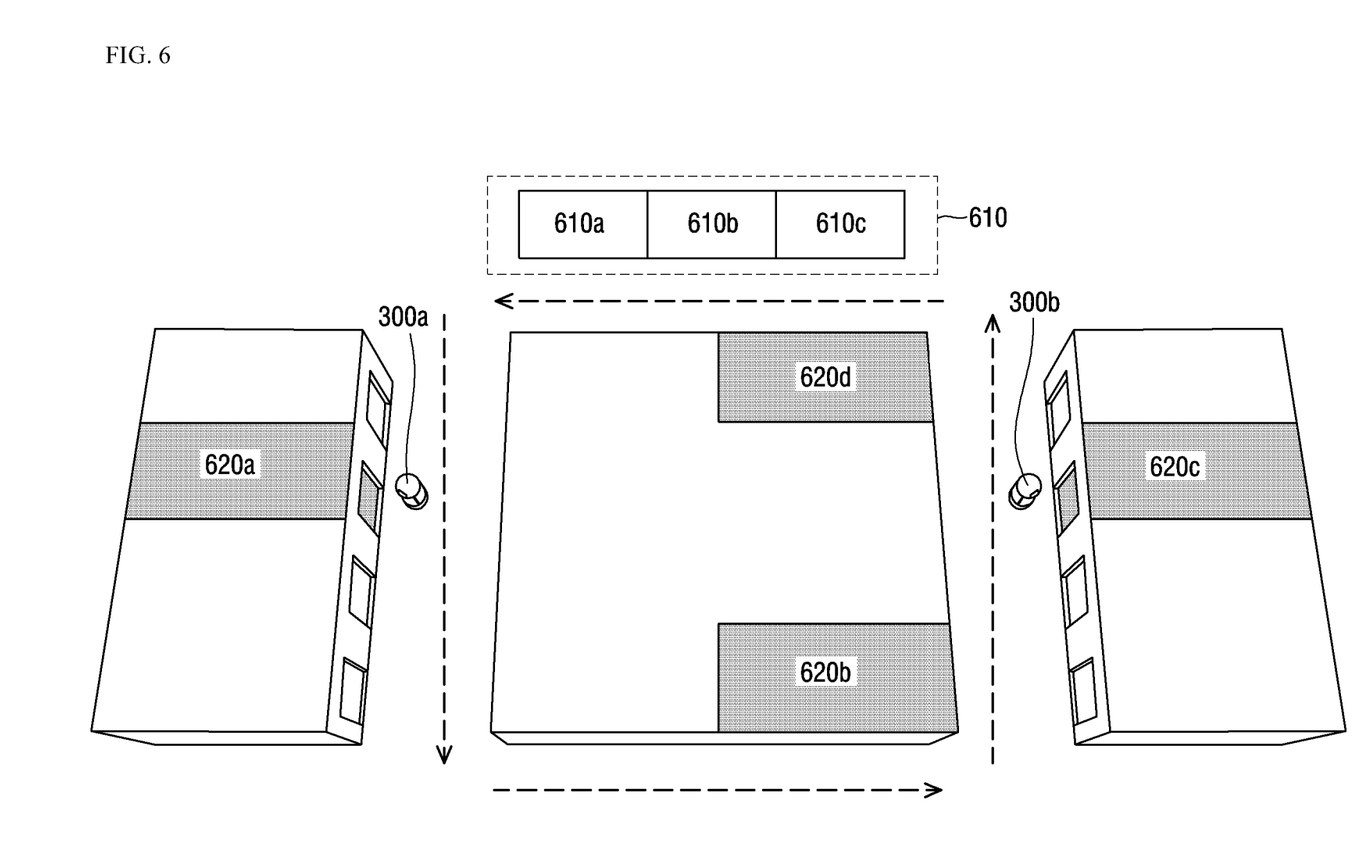
FIG. 6 illustratively shows a situation in which a robot is controlled in a serving place according to one embodiment of the invention.

FIG. 6 illustratively shows a situation in which the robot 300 is controlled in a serving place (e.g., a shared kitchen) according to one embodiment of the invention. The arrows shown in FIG. 6 indicate approximate travel routes of the robots 300 used in the serving place. However, it should be understood that the travel routes are only examples and there is no restriction on the travel routes of the robots 300 according to one embodiment of the invention. Further, although loading stations 620*a*, 620*b*, 620*c*, and 620*d* of FIG. 6 are shown in the form of specific spaces (e.g., kitchens) for convenience of illustration, it should be understood that they may refer to structures 500 such as racks installed in the corresponding spaces.

For example, referring to FIG. 6, when a first transport target object is placed at a first loading station 620*a*, the target robot determination unit 210 according to one embodiment of the invention may determine a target robot 300*a* to travel to the first loading station 620*a*, on the basis of information on a location of the first loading station 620*a* and a task situation of each of a plurality of robots 300*a* and 300*b*. In this case, the target robot determination unit 210 according to one embodiment of the invention may determine the robot 300*a* expected to have the shortest time required to reach the first loading station 620*a*, among the robots 300*a* and 300*b* capable of loading the first transport target object, as the target robot 300*a*.

Next, for example, the travel route determination unit 220 according to one embodiment of the invention may determine a travel route of the target robot 300*a* with reference to information on the location of the first loading station 620*a* and a location of a first unloading station 610*c* associated with the first transport target object, such that the travel route of the target robot 300*a* includes the first loading station 620*a* and the first unloading station 610*c*. Here, assuming that a second transport target object is loaded in the target robot 300*a*, the travel route determination unit 220 according to one embodiment of the invention may determine the travel route of the target robot 300*a* such that the target robot 300*a* visits the first unloading station 610*c* and a second unloading station 610*b* associated with the second transport target object in the order of shorter to longer travel distances to the stations.

As another example, when a first transport target object is placed at a first loading station 620*d*, it may be assumed that the robot 300*b* closest to the first loading station 620*d* has a currently empty loading space but is to load a second transport target object placed at a second loading station 620*c* into the loading space. In this situation, the target robot determination unit 210 according to one embodiment of the invention may determine the robot 300*a* capable of loading the first transport target object, among the robots other than the robot 300*b*, as the target robot 300*a*.

As yet another example, when a first transport target object is placed at a first loading station 620*a*, it may be assumed that transport target objects are loaded or are to be loaded in loading spaces of all the robots 300*a* and 300*b*. In this situation, the target robot determination unit 210 according to one embodiment of the invention may determine the robot 300*b* capable of loading the first transport target object when arriving at the first loading station 620*a* as the target robot 300*b*, on the basis of information on transport situations at the times when the robots 300*a* and 300*b* arrive at the first loading station 620*a*. That is, since the robot 300*b* passes an unloading station 610 while traveling along its travel route, the robot 300*b* is capable of loading the first transport target object when arriving at the first loading station 620*a*.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

The recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for controlling a robot, the method comprising the steps of:
   determining a target robot to travel to a first loading station among a plurality of robots, on the basis of information on a location of the first loading station and information on a task situation of each of the plurality of robots, when a first transport target object is placed at the first loading station;
   determining a travel route of the target robot with reference to the information on the location of the first loading station and information on a location of a first unloading station associated with the first transport target object; and
   causing the target robot to autonomously travel to the first loading station and load the first transport target object, and to autonomously travel to the first unloading station and unload the first transport target object,
   wherein the information on the task situation includes information on at least one of a location and a travel route of each of the plurality of robots, and information on a transport situation of each of the plurality of robots,
   wherein a second loading station is a station where a second transport target object is to be loaded,
   wherein in the step of determining the target robot, the information on the transport situation is determined as including information on whether each of the plurality of robots is capable of loading the first transport target object, such that loading of the first transport target object by one of the plurality of robots does not preclude loading of the second transport target object by the one of the plurality of robots when arriving at the second loading station after passing the first loading station, on the basis of information on the second transport target object,
   wherein each of the plurality of robots includes a plurality of loading spaces for loading objects to be transported, and the first loading station includes a plurality of supports corresponding to the plurality of loading spaces,
   wherein the plurality of loading spaces are disposed at different vertical locations and the plurality of supports are disposed at different vertical locations, and the vertical locations of the plurality of loading spaces correspond to the vertical locations of the plurality of supports on a one-to-one basis in height order,
   wherein the information on the location of the first loading station includes information on a vertical location of a support where the first transport target object is placed among the plurality of supports, and
   wherein the target robot to travel to the first loading station is determined among the plurality of robots further on the basis of information on whether a loading space of the target robot corresponding to the support where the first transport target object is placed is empty.

2. The method of claim 1, further comprising the step of:
   causing the first transport target object to be transferred from the first loading station to the target robot when the target robot arrives at the first loading station.

3. The method of claim 1, further comprising the step of:
   causing the first transport target object to be transferred from the target robot to the first unloading station when the target robot arrives at the first unloading station.

4. A non-transitory computer-readable recording medium having stored thereon a computer program for executing the method of claim 1.

5. The method of claim 1, wherein in the step of determining the target robot, the information on the transport situation is determined as further including information on whether each of the plurality of robots has an unloading station available to unload the first transport target object on a way from the first loading station to the second loading station.

6. A system for controlling a robot, the system comprising:
   a target robot determination unit configured to determine a target robot to travel to a first loading station among a plurality of robots, on the basis of information on a location of the first loading station and information on a task situation of each of the plurality of robots, when a first transport target object is placed at the first loading station;
   a travel route determination unit configured to determine a travel route of the target robot with reference to the information on the location of the first loading station and information on a location of a first unloading station associated with the first transport target object; and
   a drive unit configured to cause the target robot to autonomously travel to the first loading station and load the first transport target object, and to autonomously travel to the first unloading station and unload the first transport target object,
   wherein the information on the task situation includes information on at least one of a location and a travel route of each of the plurality of robots, and information on a transport situation of each of the plurality of robots,
   wherein a second loading station is a station where a second transport target object is to be loaded,
   wherein the target robot determination unit is configured to determine the information on the transport situation as including information on whether each of the plurality of robots is capable of loading the first transport target object, such that loading of the first transport target object by one of the plurality of robots does not preclude loading of the second transport target object by the one of the plurality of robots when arriving at the second loading station after passing the first loading station, on the basis of information on the second transport target object,
   wherein each of the plurality of robots includes a plurality of loading spaces for loading objects to be transported, and the first loading station includes a plurality of supports corresponding to the plurality of loading spaces,
   wherein the plurality of loading spaces are disposed at different vertical locations and the plurality of supports are disposed at different vertical locations, and the vertical locations of the plurality of loading spaces correspond to the vertical locations of the plurality of supports on a one-to-one basis in height order,
   wherein the information on the location of the first loading station includes information on a vertical location of a support where the first transport target object is placed among the plurality of supports, and
   wherein the target robot to travel to the first loading station is determined among the plurality of robots further on the basis of information on whether a loading space of the target robot corresponding to the support where the first transport target object is placed is empty.

7. The system of claim 6, further comprising:
a transfer module control unit configured to cause the first transport target object to be transferred from the first loading station to the target robot when the target robot arrives at the first loading station.

8. The system of claim 6, further comprising:
a transfer module control unit configured to cause the first transport target object to be transferred from the target robot to the first unloading station when the target robot arrives at the first unloading station.

9. The system of claim 6, wherein the target robot determination unit is configured to determine the information on the transport situation as further including information on whether each of the plurality of robots has an unloading station available to unload the first transport target object on a way from the first loading station to the second loading station.

\* \* \* \* \*